United States Patent [19]

Bridges

[11] Patent Number: 4,664,428
[45] Date of Patent: May 12, 1987

[54] SEALING ASSEMBLY FOR PIPE JOINT

[75] Inventor: Donald Y. Bridges, Roswell, Ga.

[73] Assignee: Brico Industries, Inc., Atlanta, Ga.

[21] Appl. No.: 846,935

[22] Filed: Apr. 1, 1986

[51] Int. Cl.[4] .............................................. F16L 21/02
[52] U.S. Cl. ................................... 285/373; 285/419; 285/910
[58] Field of Search ............... 285/419, 373, 233, 910; 138/99

[56] References Cited

U.S. PATENT DOCUMENTS

| | | | |
|---|---|---|---|
| 411,130 | 9/1889 | Robinson | 285/419 |
| 785,350 | 3/1905 | Custer | 285/373 |
| 1,839,761 | 1/1932 | Hutton | 285/419 X |
| 2,760,792 | 8/1956 | Fons | 285/373 |
| 3,173,450 | 3/1965 | Halterman | 285/373 |
| 3,235,293 | 2/1966 | Condon | 285/233 |
| 3,401,957 | 9/1968 | McCright et al. | 285/373 |
| 3,501,179 | 3/1970 | Boynton et al. | 285/373 |
| 3,700,008 | 10/1972 | Hackman | 285/373 |
| 3,994,514 | 11/1976 | Zimmerer et al. | 285/373 |
| 4,049,298 | 9/1977 | Foti | 285/373 |
| 4,124,236 | 11/1978 | Guidry | 285/373 |
| 4,360,227 | 11/1982 | Bridges | 285/910 |
| 4,463,975 | 8/1984 | McCord | 285/419 |
| 4,465,309 | 8/1984 | Ninke et al. | 285/373 |

Primary Examiner—Richard J. Scanlan, Jr.
Assistant Examiner—Douglas W. Hanson
Attorney, Agent, or Firm—Jones & Askew

[57] ABSTRACT

A pipe joint includes a novel sealing plate for sealing the axial joint or joints of a cylindrical coupling. The sealing plate carries on its upper surface a pair of axial gaskets which seal against the coupling above the sealing plate and against O-rings on the pipe sections below the sealing plate. In an alternate embodiment, the axial gaskets can be adhered to the inner surface of the coupling so as to engage the edges of the sealing plate. In another embodiment, in lieu of a separate sealing plate, one end of the coupling can carry a single axial gasket and be lapped under the other end of the coupling to form the axial seal. The sealing assemblies of the invention ar particularly useful in situations in which the pipe ends are subject to movement.

5 Claims, 12 Drawing Figures

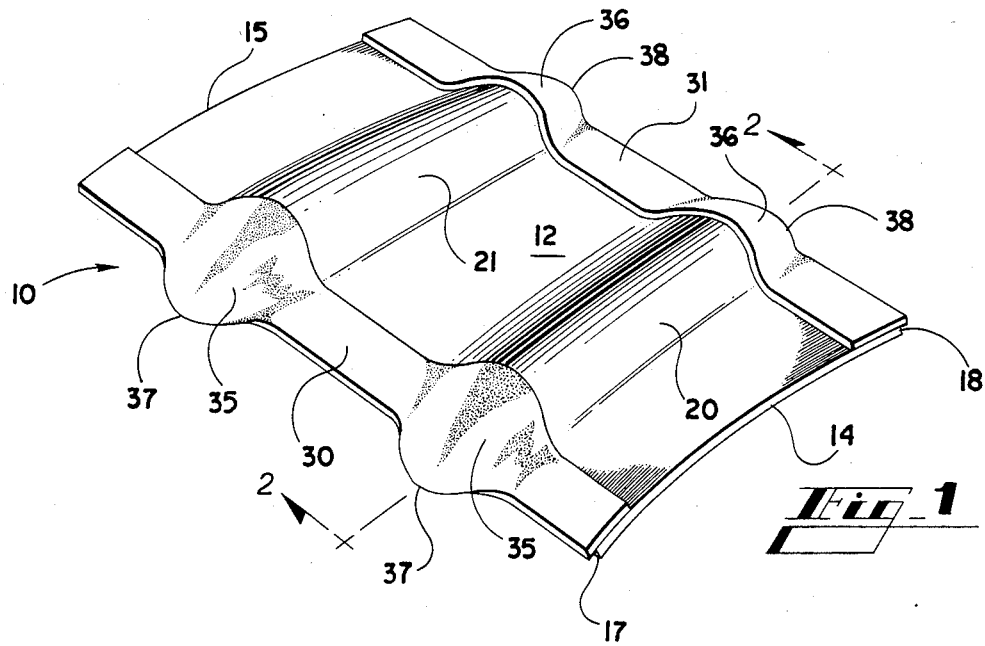
Fig_1
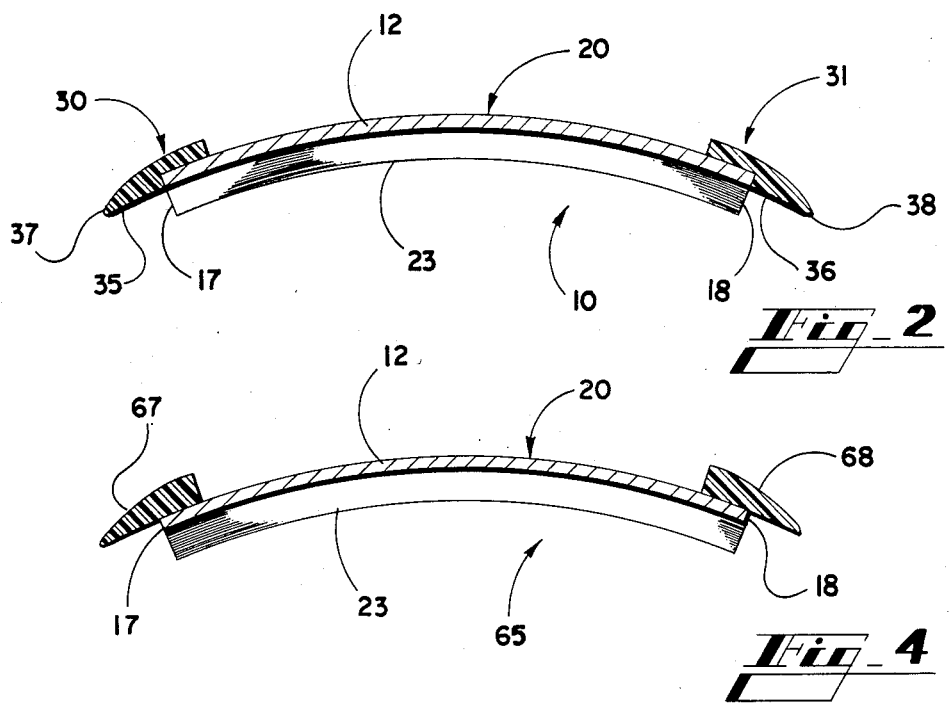
Fig_2
Fig_4

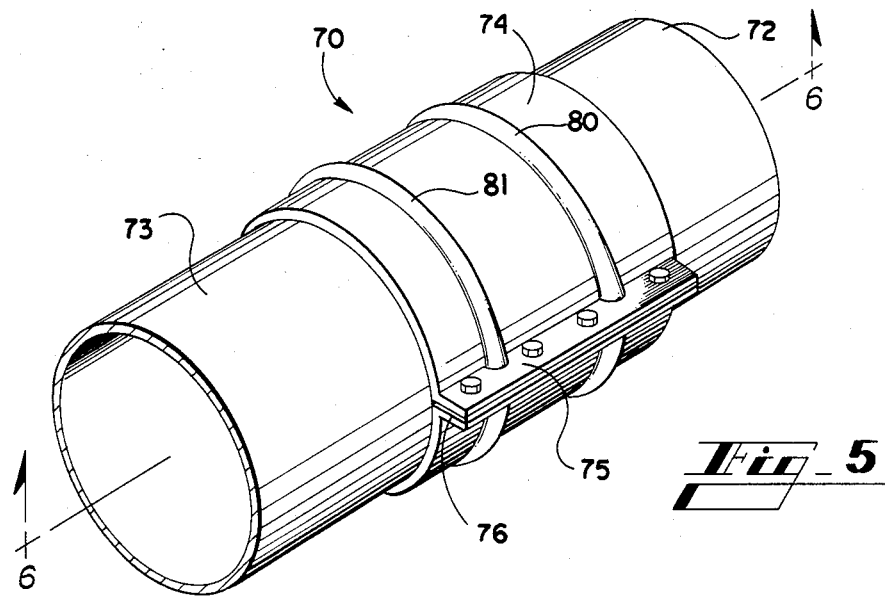
Fig_5
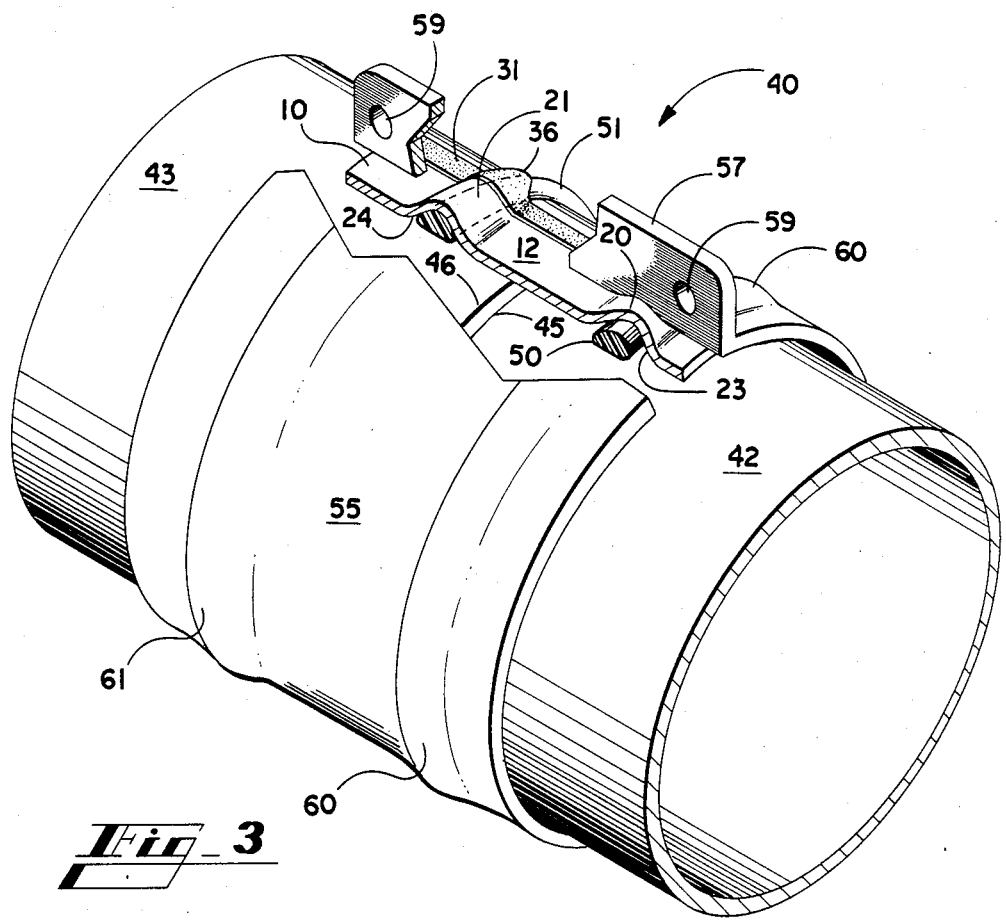
Fig_3

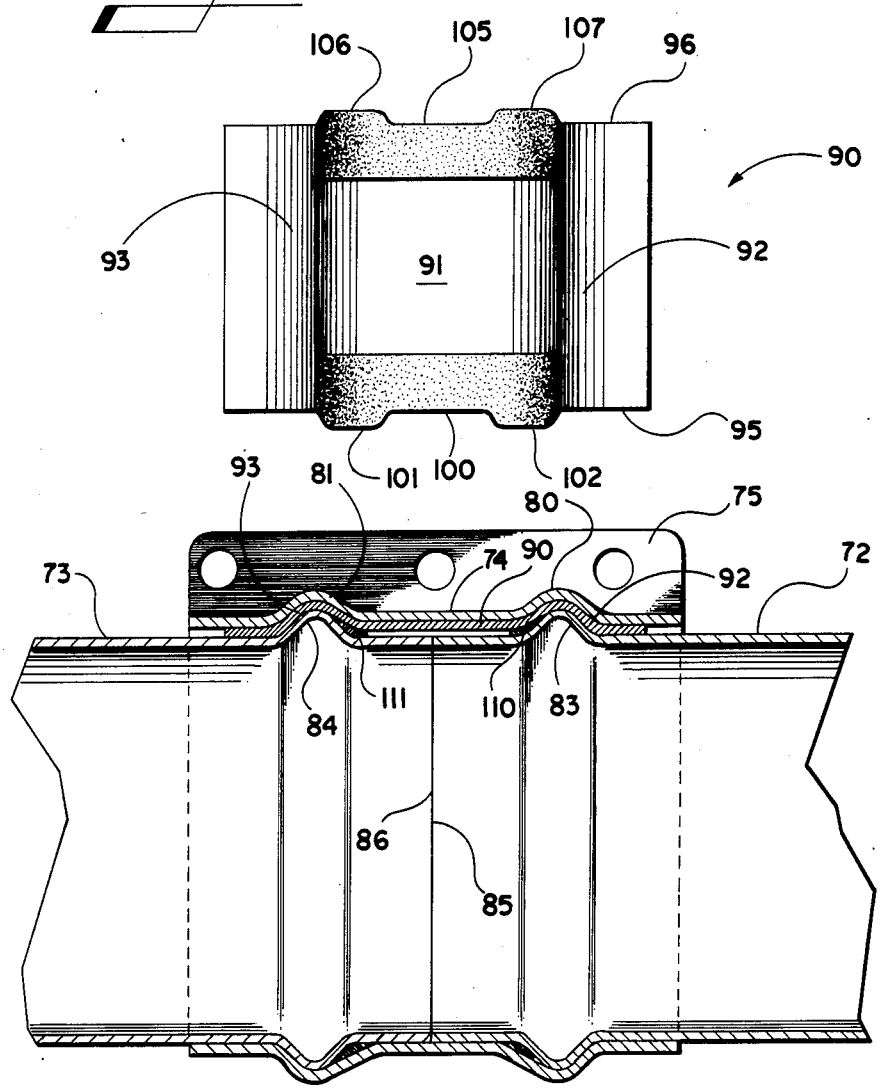

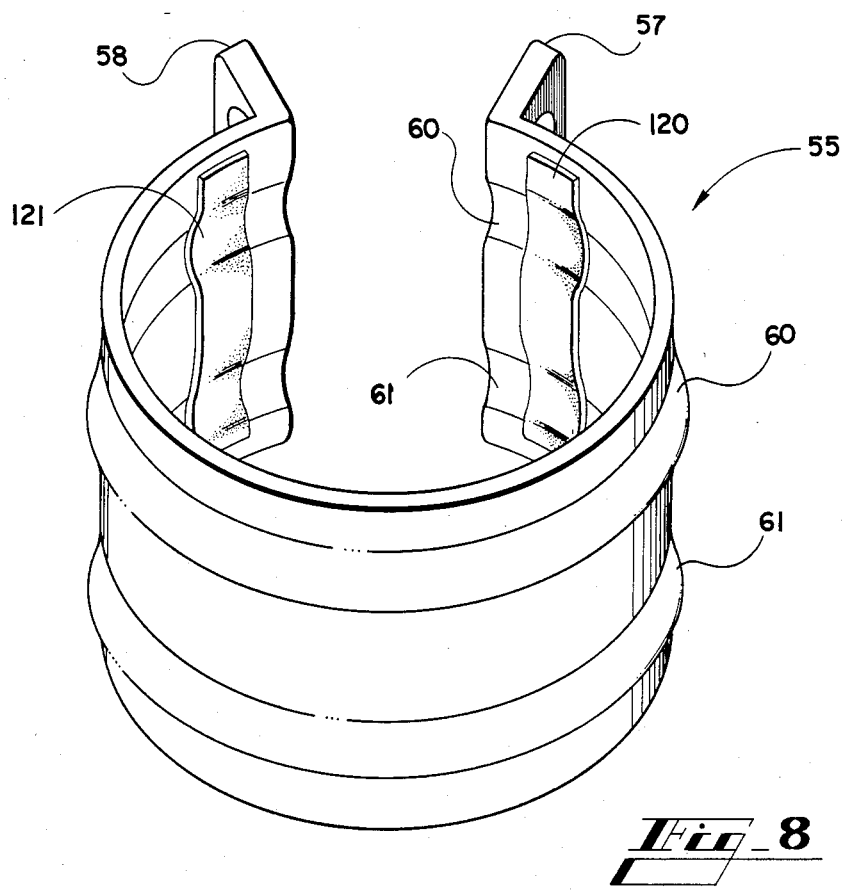
Fig_8
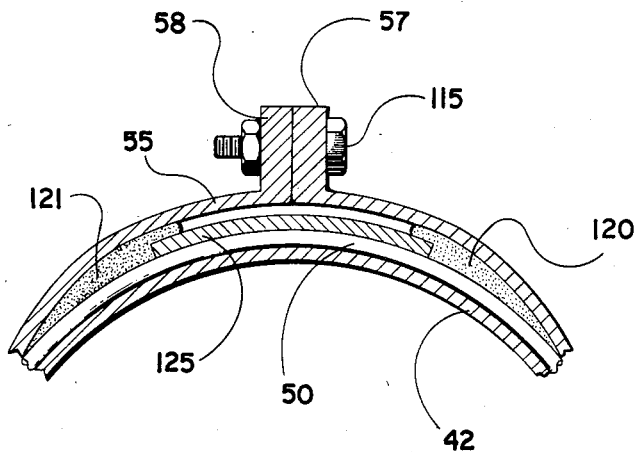
Fig_9

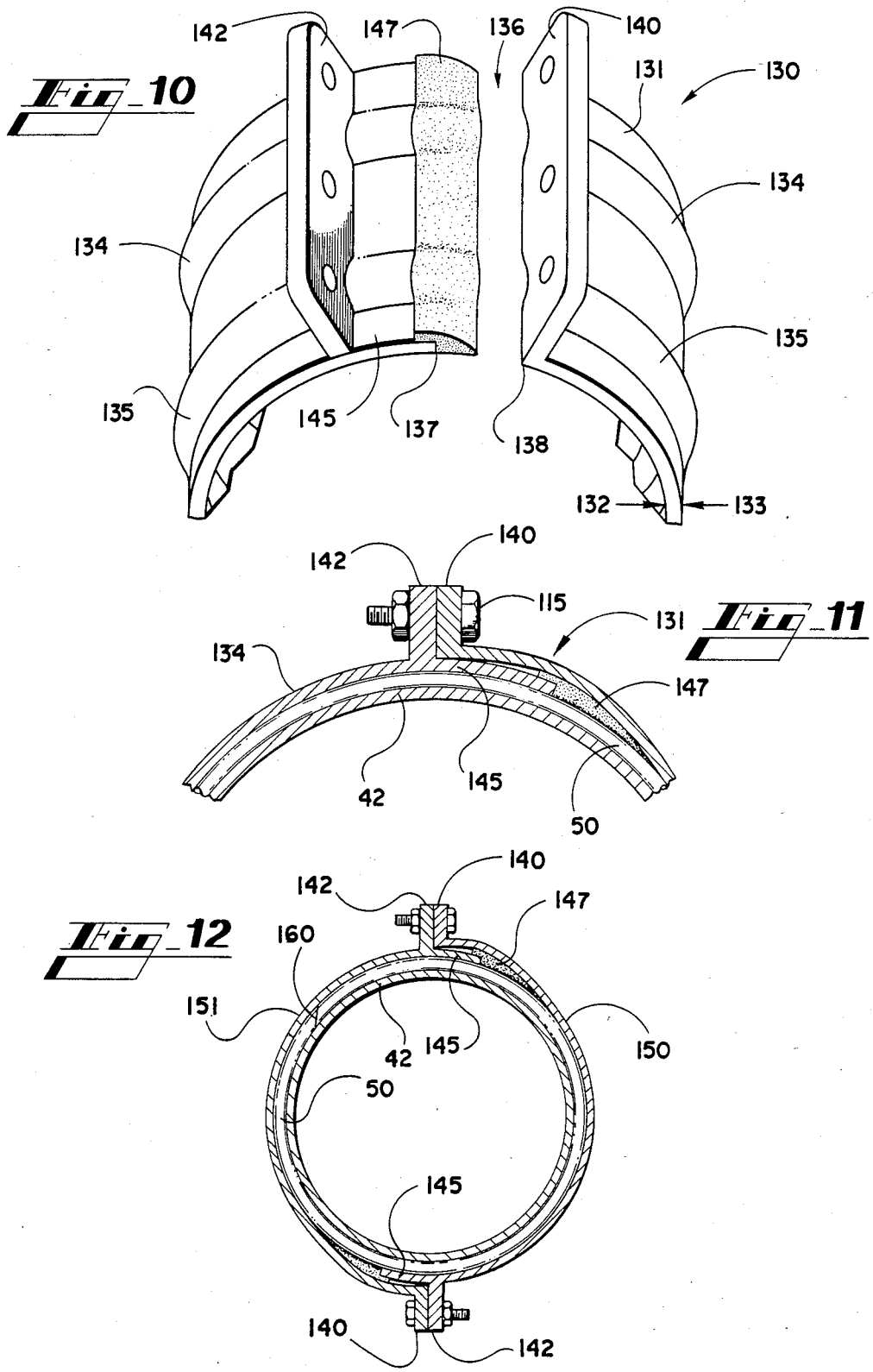

SEALING ASSEMBLY FOR PIPE JOINT

TECHNICAL FIELD

The present invention relates to couplings for joining adjacent pipe ends, and particularly relates to pipe joints that must be sealed against leakage of fluid therefrom.

BACKGROUND ART

Most pipelines must be assembled from a series of pipe sections abutted end-to-end, and many require that fluid, such as liquid chemicals or gases, or fluid-like material, such as fine particulate dust, be conveyed the length of the pipeline without leakage. In order to avoid leakage, the pipe section ends must be coupled in a manner which seals the joint. A coupling for joining two abutting pipe ends may typically include either two semi-cylindrical pieces fastened together to clamp down on the pipe ends, or a single cylindrical piece having an axial slit which allows the coupling to be opened by an amount sufficient to fit over the pipe ends.

Often, annular gasket members, such as O-rings, are placed around the pipe sections near their respective ends, to be compressed between the coupling and the outer surfaces of the pipe ends. The fluid pathway between the axial joints of the coupling then must be sealed. One approach, as shown in U.S. Pat. Nos. 2,913,262 and 3,153,550, has been to provide an axial gasket member extending between the O-rings within the axial joints of the coupling. A problem with this approach is that the coupling must be precisely closed about the pipe ends to effect a reliable seal. Another approach, as shown in U.S. Pat. No. 1,607,943 and in French Pat. No. 355,620, has been to provide an annular central web connecting the O-rings, completely surrounding the pipe ends and spanning the gap between the pipe ends. This solution has the disadvantage that if the web is physically pressed by the coupling against the pipe ends, sharp or ragged pipe ends may lead to early deterioration of the gasket. If the web is not pressed against the pipe ends by the coupling, as is the case in the above-identified French patent, then the pressure of fluid within the pipes must be relied upon to maintain the seal of the joint.

U.S. Pat. No. 4,360,227 discloses a successful pipe coupling and gasket for solving some of the problems in the art. The gasket includes O-rings joined by a web only in the area of the axial slit of the coupling. Assembly of the preferred embodiment requires molding of the shaped web and vulcanizing or otherwise bonding the web to the O-rings, plus the further attachment of a shield under the web, if desired. Installation on pipe ends requires that the pipe ends be held together while stretching both O-rings over the adjacent pipe ends, and while the coupling is fitted over the gasket and pipe ends.

Furthermore, the gasket material of the web is compressed against the pipe ends, which may move in some installations. Expansion and contraction of the pipe sections causes such movement. Also, pipelines positioned overhead or floating on a lake are not fixed or tied down, and the pipe joints may move considerably. In these installations, it is difficult to get the web and O-ring assembly to stay in place on the pipe ends during installation of the coupling.

In some such installations, one or both of the pipe ends are left smooth, without a ridge or flange to cause the coupling to pull the pipe ends firmly and rigidly together. The O-rings in such a case rest on the smooth surface of the pipe ends, and the pipe ends may shift, even to a position leaving a substantial gap between the pipe ends.

As noted above, the gasket shown in U.S. Pat. No. 4,360,227 may be provided with a metal shield between ragged ends of the pipe sections and the bottom of the web. Even with the shield in place, however, the web contacts the pipe sections and wear can result. Since this shield is positioned away from the intersection of the web and the O-rings, it may catch on the pipe ends during installation of the O-rings. Movement of the shield with the pipe ends is transmitted to the web, which is compressed against the shield. Such movement could dislodge the web from its proper sealing position. In a situation in which the pipe ends can separate to form a substantial gap, the shield would have to be made wider to avoid falling into the gap, but if allowed to approach the O-rings too closely, could interfere with the sealing function of the web or the O-rings. For these reasons the gasket of U.S. Pat. No. 4,360,227 is best used with couplings which positively lock the pipe ends together and minimize movement of the pipe ends.

Thus, there has been a need in the art for a means to seal the axial joints of pipe couplings that is easier to install and better adapted to the problems caused by movement of the pipe ends.

SUMMARY OF THE INVENTION

The present invention solves the problems described above by moving the axial sealing surfaces needed to seal an axial coupling joint away from contact with the pipe sections.

Generally described, the present invention provides a pipe joint for joining a pair of adjacent pipe ends, comprising a cylindrical coupling member including an axial slit; a pair of annular gasket members shaped to be fitted over the pipe ends and compressed by the coupling member; a sealing plate spanning the axial slit of the coupling member, and contacting both the annular gasket members; and sealing gasket means for preventing passage of fluid from between the annular gasket members to the outer surface of the sealing plate. The sealing gasket means is preferably positioned in isolation from contact with the pipe ends, and can comprise a pair of axial gasket members extending along opposite axial edges of the sealing plate between the sealing plate and the coupling member, and between the annular gasket members.

In another embodiment, the invention provides a sealing plate for sealing an axial joint of a pipe coupling, the coupling being formed to compress a pair of annular gasket members fitted around adjacent pipe ends, comprising a flat base spanning the axial joint of the coupling, and contacting both the annular gasket members, when the sealing plate is positioned to seal the axial joint; and sealing gasket means mounted on the base for preventing passage of fluid from between the annular gasket members to the outer surface of the sealing plate. Preferably, the base defines a pair of spaced apart axial edges extending between the annular gasket members on opposite sides of the axial joint of the coupling, with the base contacting both the annular gasket members between the axial edges of the base; and the sealing gasket means preferably comprises a pair of axial gasket members positioned between the base and the coupling along the axial edges between the annular gasket members. Portions of the axial gasket members, in the region of the annular gasket members, preferably extend from a position contacting the outer surface of the base to a position spaced outwardly from the axial edges, such that the coupling contacts the axial gasket members along the length thereof and compresses the axial gasket members against the annular gasket members. The portions of the axial gasket members in the region of the annular gasket members preferably extend around and are adhered to the surface of the axial edge of the sealing plate.

The sealing plate of the present invention is preferably shaped in axial cross section to match the contour of the inner surface of the coupling member, and in radial cross section to match the outer surface of the pipe ends. The sealing plate can extend axially beyond both of the annular gasket members define a pair of annular arcuate grooves extending outwardly from the inner surface of the sealing plate for receiving the annular gasket members.

Installation and sealing of a pipe joint according to the present invention is easier than past apparatus, particularly when the pipe ends are floating or are suspended overhead. The O-rings can be individually fitted over the adjacent pipe ends and will stay in position. The coupling can then be moved into place and partially closed around the pipe to restrain the ends. With the pipe ends thus stabilized, and the coupling still partially open, the sealing plate can be placed across the O-rings and the coupling fully closed.

In place, the sealing plate provides sealing gasket members connecting the O-rings and sealing against the coupling without contacting the pipe sections. The sealing plate of the invention differs from the shield used in the past in that the sealing plate holds the gasket members away from the pipe sections completely rather than forming a barrier compressed between the gasket material and the rough ends of the pipe sections. Movement of the pipe ends will not cause wear on the gasket members of the sealing plate. Furthermore, since the sides of the O-rings are not fixed to a gasket member, the O-rings will tend to roll in response to pipe movement and therefore experience less abrasive movement across the pipe surfaces.

In another embodiment of the invention, a pipe coupling is provided for joining and sealing a pair of adjacent pipe ends having annular gasket members fitted over the ends of the pipe ends, comprising a cylindrical member having an inner surface and an outer surface, and including an axial joint defined by a first axial edge and a second axial edge; means for joining the first axial edge to the outer surface of the cylindrical member at a location spaced apart from the second axial edge, such that the cylindrical member compresses the annular gaskets members, and such that the second axial edge is positioned adjacent to the inner surface of the cylindrical member at a location spaced apart from the first axial edge; and sealing gasket means for preventing passage of fluid from between the annular gasket members to the outer surface of the cylindrical member.

The sealing gasket means preferably comprises an axial gasket member extending along the second axial edge between the second axial edge and the inner surface of the cylindrical member between the annular gasket members. Only one axial gasket member is required, whereas the sealing plate described above requires two. As in previous embodiments, the axial gasket member can be adhered to either the inner or the outer member, which in the case of this embodiment are the second axial edge and the inner surface of the cylindrical member above the second axial edge, respectively. To provide the means for joining the first axial edge to the cylindrical member, a flange can be attached to the outer surface of the cylindrical member spaced apart from the second axial edge.

Each embodiment of the invention can be utilized with a coupling having two axial joints. This can be useful in situations in which the pipe ends cannot be separated for fitting the O-rings or a single-piece coupling onto a pipe end.

Thus, it is an object of the present invention to provide an improved pipe joint.

It is a further object of the present invention to provide a sealing plate for sealing the axial joint of a pipe coupling.

It is a further object of the present invention to provide a pipe joint sealing apparatus that is easy to install.

It is a further object of the present invention to provide a pipe joint sealing apparatus that maintains full integrity of the seal even when the pipe ends have moved significantly.

It is a further object of the present invention to provide a pipe joint sealing apparatus which isolates the axial gasket components from contact with the pipe sections.

It is a further object of the present invention to provide a pipe joint sealing apparatus that is better able to accommodate pipe expansion and contraction during long periods of use.

Other objects, features, and advantages of the present invention will become apparent upon reading the following detailed description of embodiments of the invention, when taken in conjunction with the accompanying drawing and the appended claims.

BRIEF DESCRIPTION OF THE DRAWING

FIG. 1 is a pictorial view of a sealing plate embodying the present invention.

FIG. 2 is a cross sectional view of the sealing plate of FIG. 1, taken along line 2—2.

FIG. 3 is a pictorial view of the sealing plate of FIG. 1 in place in a pipe joint, with portions broken away to show detail.

FIG. 4 is a cross sectional view of a second embodiment of a sealing plate embodying the invention.

FIG. 5 is a pictorial view of a pipe coupling joining two pipe ends.

FIG. 6 is a cross sectional view of the pipe joint of FIG. 5, taken along line 6—6 of FIG. 5.

FIG. 7 is a top plan view of a third embodiment of a sealing plate embodying the invention as used in the pipe joint shown in FIG. 6.

FIG. 8 is a pictorial view of a pipe coupling according to a fourth embodiment of the invention.

FIG. 9 is a radial cross sectional view of a pipe joint utilizing the coupling of FIG. 8.

FIG. 10 is a partial pictorial view of a pipe coupling embodying a fifth embodiment of the invention.

FIG. 11 is a radial cross sectional view of a pipe joint utilizing the coupling of FIG. 10.

FIG. 12 is a radial cross sectional view of a pipe joint utilizing a two piece coupling including sealing means of the type shown in FIG. 10.

DETAILED DESCRIPTION

Referring now in more detail to the drawing, in which like numerals refer to like parts throughout the several views, FIG. 1 shows a sealing plate 10 embodying the invention. The sealing plate 10 includes a base 12 molded or formed from a sheet material such as stainless steel, carbon steel, fiberglass, nylon, plastic, or the like. The preferred material for the base 12 will depend upon the nature of the material to be conveyed in the pipeline. Those skilled in the art will understand that the pipe material and the material for the base 12 must not be subject to significant corrosion by the substance within the pipeline, and some pipelines must be resistant to deterioration caused by the external environment, such as water, a corrosive atmosphere, the weather, or other particular environment. The preferred thickness of the base 12 varies with the diameter of the coupling. A stainless steel sealing plate 10 may vary in thickness from 20 gauge (0.035") for small diameter couplings to 7 gauge (0.180") for large diameter couplings.

The base 12 can conveniently have a generally rectangular shape, although the outline of the base is not critical. As shown in FIG. 1, the base 12 defines a pair of spaced apart circumferential edges 14 and 15, and a pair of spaced apart axial edges 17 and 18 which intersect the circumferential edges. The term "circumferential" used herein means a dimension generally following the curvature of a pipe or pipe ends being joined, and the term "axial" means a dimension generally parallel to the longitudinal axis of the pipe or pipe ends. Axial or circumferential edges described herein preferably are linear but need not be linear.

Spaced inwardly from the two circumferential edges 14 and 15, a pair of arcuate protrusions 20 and 21 extend between the axial edges 17 and 18 on the outer surface of the base 12. The formation of these protrusions creates a pair of corresponding arcuate grooves 23 and 24 in the inner side of the base 12, as shown in FIGS. 2 and 3. The grooves 23 and 24 receive O-rings, as described below.

A pair of axial gasket members 30 and 31 are attached to the outer surface of the base 12 along the axial edges 17 and 18. The axial gasket members 30 and 31 must extend at least between and partially over the arcuate protrusions 20 and 21. The gasket members may be vulcanized to the base 12 or bonded to the base by an appropriate adhesive. As best shown in FIG. 2, the axial gasket members are preferably shaped to include gasket extensions 35 and 36 which extend over the axial edges 17 and 18 of the base 12 in the area of each of the four arcuate protrusions, and are tapered to narrow edges 37 and 38. In the preferred embodiment shown in FIGS. 1 and 2, the axial gasket members 30 and 31 also extend inwardly along the surface of the axial edges 17 and 18, and may be secured to such edges.

The composition of the gasket material used to form the gasket members 30 and 31 may vary depending upon the substance to be carried by the pipeline and the composition of the pipe itself. A gasket material preferred for high pressure heavy duty pipelines is molded EPDM rubber. Other types of rubber, foam rubber, sponge, or other compressible material may be appropriate depending upon the application. For example, lightweight foam rubber might be appropriate for a plastic pneumatic pipeline carrying dust.

FIG. 3 shows a fully installed pipe joint 40 using a sealing plate 10. A pair of pipe sections 42 and 43 are shown with their respective ends 45 and 46 closely adjacent to one another. A pair of O-rings 50 and 51, or similar annular gasket members, are fitted around the adjacent pipe sections. The sealing plate 10 is placed over the O-rings, which are received within the arcuate grooves 23 and 24. The gasket extensions 35 and 36 extend over the O-rings. A cylindrical coupling 55 is placed over the pipe ends, O-rings and sealing plate 10. The coupling 55 defines at least one axial slit bordered by clamping flanges 57 and 58. One of the clamping flanges 57 is shown in FIG. 3, and includes a plurality of openings 58 for use in joining the two clamping flanges together. The coupling 55 is placed on the pipe ends so that the clamping flanges come together over the sealing plate 10.

The coupling 55 defines a pair of annular protrusions 60 and 61. As described in U.S. Pat. No. 4,360,227, which is expressly incorporated herein by reference in its entirety, the protrusions 60 and 61 may be used to retain the pipe ends against axial separation, in a manner shown in FIGS. 5 and 6, and described below. However, in FIG. 3 the pipe sections 42 and 43 are smooth in the area under the coupling 55 and the O-rings rest on the smooth surface. Such an arrangement allows for significant movement of the pipe ends with respect to one another.

It will be seen from FIGS. 1 and 3 that the axial cross section of the sealing plate 10 is formed to match the underside of the coupling 55 in the area of the clamping plates, and that the cross section parallel to the pipe ends 45 and 46 matches the curvature of the outer surface of the pipe sections 42 and 43. The annular protrusions 60 and 61 of the coupling 55 are matingly received over the arcuate protrustions 20 and 21 of the sealing plate 10, which are positioned over the O-rings and compress the O-rings against the pipe ends under the force of the coupling. As an alternative to the configuration shown, both the sealing plate and the coupling could be formed without the protrusions 20,21 and 60,61, respectively.

The force of the coupling also compresses the axial gasket members. Between the arcuate protrusions 20 and 21 the axial gasket members form a seal against the inner surface of the coupling 55. The gasket extensions 35 and 36 are compressed by the coupling against the O-rings 50 and 51. The configuration of the axial gasket members in FIG. 3 is very similar to that shown in FIG. 9. Those skilled in the art will understand that if a complete seal is necessary, there must be no gap between the coupling and the O-rings at the axial edges of the sealing plate 10; such gap must be filled by the compression of the gasket extensions 35 and 36 and of the O-rings. The corners of the axial edges 17 and 18 can be beveled or rounded (not shown), if desired, to facilitate sealing of the gap and to prevent damage to the O-rings that might be caused by any relative movement between the O-rings and the sealing plate.

If the gasket material is a relatively stiff material, such as EPDM rubber, the preferred configuration, in which the gasket extensions extend inwardly along the axial edges of the base 12 and are tapered to thin edges 37 and 38, is desired. A more compressible gasket material may be able to fill the gaps in question by extending outwardly beyond the axial edges 17 and 18 without extending inwardly along the axial edges.

Such an alternate configuration of the gasket extensions is shown in the embodiment of FIG. 4, which shows a sealing plate 65. A pair of axial gasket members 67 and 68 extend along the axial edges 17 and 18 of the base 12 similarly to the positioning of the axial gasket members 30 and 31 in FIG. 1. However, the gasket members 67 and 68 do not extend inwardly along the axial edges of the base when not compressed. In this configuration, the gasket material must be compressable enough and bulky enough to fill the gaps created where the axial edges of the sealing plate 65 separate the coupling from the O-rings.

Installation of the pipe joint 40 will be apparent from the foregoing description. The O-rings 50 and 51 are fitted around their respective pipe ends 42 and 43. This can be done before the pipe ends are brought into proximity. Either before or after positioning of the O-rings, the coupling 55 can be slipped over one pipe end, the pipe ends brought together, and the coupling positioned over the adjacent pipe ends. If circumstances make it difficult to hold the pipe ends close to one another, the coupling can be partially closed to retain the pipe ends. Then the sealing plate 10 is placed onto the pipe ends with the grooves 23 and 24 over the O-rings. The clamping plates 57 and 58 are then brought together over the sealing plate to compress the O-rings and the axial gasket members 30 and 31 as described above. Fluid within the pipeline passing outwardly from the pipe ends cannot pass axially beyond the O-rings, and cannot pass the axial gasket members 30 and 31 to reach the axial slit of the coupling which is above the sealing plate 10.

External conditions may cause the pipe sections 42 and 43 to move while the pipeline is in use. This may result in the pipe ends 45 and 46 separating from one another. The sealing plate 10 provides advantages in such a situation because of its construction. The axial gasket members 30 and 31 will be unaffected by the movement of the pipe ends because the axial gasket members are positioned on the upper surface of the sealing plate, isolated from the pipe ends. Because its protrusions 20 and 21 fit into mating protrusions 60 and 61 of the coupling 55, the sealing plate will not be shifted by the movement of the pipe ends and therefore will maintain the axial seal between the sealing plate and the coupling. The seal between the axial gasket members and the O-rings 50 and 51 will also be maintained because the arcuate grooves 23 and 24 maintain the O-rings in position under the gasket extensions 35 and 36 as the pipe sections move under the O-rings.

In the case of the alternate construction in which the coupling and sealing plate are flat, the gasket extensions can be extended for the length of the axial edges 17 and 18 so that a seal with the O-rings is maintained even in the event of relative movement between the sealing plate and the O-rings. With such a construction the O-rings would tend to roll rather than slide over the pipe sections.

Those skilled in the art will understand that couplings split into two semi-cylindrical halves are often utilized. These couplings have two sets of clamping plates and require two sealing plates, one under each of the two axial slits in the coupling. Construction and installation of both sealing plates is similar to that described above for couplings with a single axial slit.

FIGS. 5-7 show another embodiment of a pipe joint 70 incorporating the present invention. Adjacent pipe sections 72 and 73 are retained by a coupling 74 which defines outward annular protrusions 80 and 81 similar to the protrusions 60 and 61 of FIG. 3, except the protrusions 80 and 81 are asymmetrical in cross section, as shown in FIG. 6. The pipe sections each define arcuate protrusions or flanges 83 and 84 spaced inwardly from pipe ends 85 and 86. As is known in the art, the flanges as shown, formed from the material of the pipe sections, can be replaced by a metal rod welded to the outer surface of the pipe section to form a flange. The flanges 83 and 84 are normally positioned and shaped to be received within grooves formed by the coupling protrusions 80 and 81, as shown in U.S. Pat. No. 4,360,227.

A sealing plate 90 for use in the pipe joint 70 is shown in top plan view in FIG. 7. A base 91 is formed with a pair of arcuate protrusions 92 and 93 separated by the same distance as the flanges 83 and 84 when the pipe ends are adjacent to one another. The outer surface of the sealing plate 90 matches the inner surface of the coupling 74, and therefore the protrusions 92 and 93 are asymmetrical and are matingly received in the protrusions 80 and 81 of the coupling 74. The base 91 of the sealing plate 90 defines a pair of axial edges 95 and 96. A pair of axial gasket members 100 and 105 are fixed to the outer surface of the base 91 along the axial edges 95 and 96. The axial gasket member 100 defines two gasket extensions 101 and 102, and the member 105 defines extensions 106 and 107. The axial gasket members 100 and 105 extend only between the top of the arcuate protrusions 92 and 93.

The asymmetry of the arcuate protrusions of the sealing plate 90 creates an annular space for O-rings 110 and 111, as shown in FIG. 6, because the flanges 83 and 84 of the pipe sections are symmetrical. The coupling 74 and sealing plate 90 thus are able both to hold the pipe sections firmly in place and to retain and compress the O-rings, in a manner similar to that described in U.S. Pat. No. 4,360,227. The gasket extensions 101, 102, 106 and 107 need only cover the inner slope of each arcuate protrusion of the sealing plate 90 because the O-rings are located only under such inner slopes. In other respects, the sealing plate 90 functions like the sealing plate 10.

The axial gasket members required along the axial edges of the sealing plate in a pipe joint according to the present invention can be attached to the interior of the coupling rather than to the sealing plate itself. This alternate embodiment is shown in FIGS. 8 and 9. The coupling 55 has a pair of axial gasket members 120 and 121 adhered to its inner surface at locations spaced inwardly from the two edges of the coupling's axial joint. The axial gasket members 120 and 121 are positioned such that when the coupling is closed about the pipe ends, as shown in FIG. 9, the axial gasket members 120 and 121 are compressed along the axial edges of a bare sealing plate 125, so that fluid can pass neither to the outer surface of the sealing plate, nor axially between the coupling and the O-rings 50 and 51. The sealing relationship between the components as shown in FIG. 9 is similar to that achieved in the pipe joint shown in FIGS. 3 and 6, even though in the former embodiments the axial gasket members are attached to the sealing plate.

Bolt and nut assemblies 115 as shown in FIG. 9 can be used in all of the embodiments described to close the coupling by drawing the flanges 57 and 58 together and holding the coupling tightly about the pipe ends. Clamps or any other appropriate means for holding the clamping flanges together can alternately be used. It should be noted that the nature of the pipe joint according to the invention permits a sealed joint to be achieved even if the flanges 57 and 58 cannot be pulled completely together.

Another embodiment of the invention is shown in FIGS. 10–12. A coupling 130 includes a cylindrical member 131 having an inner surface 132 and an outer surface 133. A pair of annular protrusions 134 and 135 of the type described above are formed in the cylindrical member 131. An axial joint 136 in the coupling is defined by a first axial edge 137 and a second axial edge 138. A clamping flange 140 extends outwardly from the first edge 137. Another clamping flange 142 is fixed to the cyindrical member at a location spaced apart from the second axial edge 138, thus forming a sealing extension 145 identical in cross section to the rest of the coupling 130. An axial gasket member 147 is attached to the outer surface 133 of the extension 145 along the second axial edge 138, in a manner similar to the attachment of axial gasket members 30 and 31 to the sealing plate 12 in FIG. 1. The axial gasket member 147 can be identical to one of the gasket members 30 or 31.

It will be seen from FIG. 11 that the integral sealing extension 145 takes the place of the separate sealing plates of prior embodiments, and requires only one axial gasket member to effect a seal of the axial joint of the coupling 130. After O-rings are fitted over the pipe ends, the coupling 130 is also placed over one pipe end, and the pipe ends are brought together. The coupling 130 is then centered over the pipe joint with the annular protrusions 134 and 135 over the O-rings. As the coupling is closed about the joint, the extension 145 extends under the inner surface 133 of the cylindrical member 131, and the axial gasket member 147 engages the inner surface 132. The compression force of the coupling compresses the gasket member 147 into sealing relationship with the O-rings, as shown in FIG. 11 when the clamping flanges 140 and 142 meet. The axial joint 136 of the coupling 130 is thus completely sealed by means of an axial gasket member on only one side of the joint 136.

The invention as shown in FIG. 10 can be embodied in a coupling having two semi-cylindrical halves 150 and 151, as shown in FIG. 12. Such a coupling has two axial joints and therefore requires two sealing assemblies. Each of the coupling halves 150 and 151 terminates at one end in a clamping flange 140 along an axial edge, and at the other end in a sealing extension 145 defined by a clamping flange 142. The complementary ends of the two coupling halves fit together as shown in FIG. 12 with each of the two axial joints being sealed in the manner shown in FIG. 11. Such a two piece coupling is especially useful when the pipe ends cannot be separated enough to slide a one piece coupling over one of the pipe ends. If the O-rings also cannot be slipped over the pipe ends, strips of O-rings material can be wrapped around the pipe ends and bonded, as at 160, to form a complete O-ring.

Those skilled in the art will understand that the pipe joints disclosed in connection with FIGS. 1–9 can also be utilized with two piece couplings.

Those skilled in the art will also understand that the invention can be utilized with non-rigid couplings wrapped about the pipe ends, and that many alternatives to the clamping flanges described can be utilized to hold the coupling closed about the pipe ends.

While this invention has been described in detail with particular reference to preferred embodiments thereof, it will be understood that variations and modifications can be effected within the spirit and scope of the invention as described hereinbefore and as defined in the appended claims.

I claim:

1. A pipe coupling for joining and sealing a pair of adjacent pipe ends having annular gasket members fitted over the ends of said pipe ends, comprising:
   a cylindrical member having an inner surface and an outer surface, and including an axial joint defined by a first axial edge and a second axial edge;
   means for joining said first axial edge to the outer surface of said cylindrical member at a location spaced apart from said second axial edge, such that said cylindrical member compresses said annular gasket members, and such that said second axial edge is positioned adjacent to the inner surface of said cylindrical member at a location spaced apart from said first axial edge; and
   sealing gasket means for preventing passage of fluid from between said annular gasket members to the outer surface of said cylindrical member comprising an axial gasket member adhered to the outer surface of said cylindrical member adjacent to said second axial edge and extending beyond said second axial edge to a position spaced outwardly from said second axial edge in the region of said annular gasket members.

2. The pipe coupling of claim 1, wherein said means for joining said axial edge to the outer surface of said cylindrical member comprises:
   a first flange extending outwardly from said cylindrical member at said location spaced apart from said second axial edge;
   a second flange extending outwardly from said cylindrical member at said first axial edge; and
   means for holding said flanges adjacent to one another.

3. The pipe coupling of claim 1, further comprising:
   a second axial joint defined by a third axial edge and a fourth axial edge;
   means for joining said third axial edge to the outer surface of said cylindrical member at a location spaced apart from said fourth axial edge, such that said cylindrical member compresses said annular gasket members, and such that said fourth axial edge is positioned adjacent to the inner surface of said cylindrical member at a location spaced apart from said third axial edge; and
   second sealing gasket means for preventing passage of fluid from between said annular gasket members to the outer surface of said cylindrical member at the location of said second axial joint.

4. The pipe coupling of claim 1, wherein said axial gasket member extends around and is adhered to the surface of said second axial edge.

5. The pipe coupling of claim 4, wherein said cylindrical member defines a pair of annular arcuate grooves extending outwardly from the inner surface thereof for receiving said annular gasket members;
   said axial gasket member being shaped to follow the contour of said arcuate grooves.

* * * * *

UNITED STATES PATENT AND TRADEMARK OFFICE
CERTIFICATE OF CORRECTION

PATENT NO. : 4,664,428

DATED : May 12, 1987

INVENTOR(S) : Donald Y. Bridges

It is certified that error appears in the above-identified patent and that said Letters Patent is hereby corrected as shown below:

On the title page, first column, cancel the following text "[73] Assignee: Brico Industries, Inc., Atlanta, Ga."

Signed and Sealed this

Fourth Day of October, 1994

Attest:

BRUCE LEHMAN

Attesting Officer

Commissioner of Patents and Trademarks